United States Patent
Tsirtsis et al.

(10) Patent No.: US 8,184,615 B2
(45) Date of Patent: May 22, 2012

(54) WIRELESS TERMINAL METHODS AND APPARATUS FOR ESTABLISHING CONNECTIONS

(75) Inventors: George Tsirtsis, New York, NY (US); M. Scott Corson, Gillette, NJ (US); Vincent Park, Budd Lake, NJ (US); Rajiv Laroia, Basking Ridge, NJ (US); Pablo Anigstein, Springfield, NJ (US); Richard J. Dynarski, Freehold, NJ (US); Matthew Impett, Annapolis, MD (US); Prashanth Hande, Jersey City, NJ (US); Prasanna Nadhamuni, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1838 days.

(21) Appl. No.: 11/249,013

(22) Filed: Oct. 12, 2005

(65) Prior Publication Data
US 2007/0081521 A1    Apr. 12, 2007

(51) Int. Cl.
H04L 12/66 (2006.01)
H04L 12/56 (2006.01)
H04W 4/00 (2009.01)

(52) U.S. Cl. .................. 370/352; 370/392; 370/328

(58) Field of Classification Search .............. 370/328, 370/352–356; 709/247; 379/121.06
See application file for complete search history.

(56) References Cited

U.S. PATENT DOCUMENTS

| | | | |
|---|---|---|---|
| 6,542,992 B1 | 4/2003 | Peirce, Jr. et al. | |
| 7,218,634 B1 | 5/2007 | Khalil et al. | |
| 7,224,673 B1 * | 5/2007 | Leung et al. | 370/328 |
| 2003/0153325 A1 | 8/2003 | Veerepalli et al. | |
| 2004/0103282 A1 * | 5/2004 | Meier et al. | 713/171 |
| 2005/0114513 A1 * | 5/2005 | Dorenbosch et al. | 709/227 |
| 2006/0039358 A1 * | 2/2006 | Kim | 370/352 |

FOREIGN PATENT DOCUMENTS

| | | |
|---|---|---|
| JP | 2003516058 | 5/2003 |
| JP | 2005124077 A | 5/2005 |
| JP | 2005217626 A | 8/2005 |
| JP | 2009512343 | 3/2009 |
| WO | WO 00/79760 | 12/2000 |
| WO | WO0119050 A2 | 3/2001 |
| WO | WO0141470 | 6/2001 |
| WO | WO 01/89157 | 11/2001 |
| WO | WO0189157 A2 | 11/2001 |
| WO | WO03005657 A1 | 1/2003 |
| WO | WO 03/090425 | 10/2003 |
| WO | WO 2004/034670 | 4/2004 |
| WO | WO2005041549 | 5/2005 |
| WO | WO2005052736 | 6/2005 |

OTHER PUBLICATIONS

C. Perkins, Ed., "RFC 3344 IP Mobility Support for IPv4", Aug. 2002, Network Working Group.*
S. Deering, Ed., "RFC 1256 ICMP Router Discovery Messages", Sep. 1991, Network Working Group.*
International Preliminary Report on Patentability from International Application No. PCT/US2006/039979; dated Jan. 2, 2008; pp. 1-7.
International Search Report with Written Opinion of the International Searching Authority for International Application No. PCT/US2006/039979, pp. 1-10; dated Mar. 5, 2007.

* cited by examiner

*Primary Examiner* — Melanie Jagannathan
*Assistant Examiner* — Joel Hamel
(74) *Attorney, Agent, or Firm* — Michelle Gallardo; Nicholas J. Pauley; Jonathan T. Velasco (57) ABSTRACT

Methods and apparatus for establishing communication links, used to support communications sessions with one or more end nodes, e.g., mobile devices, are described. Various features are directed to a mobile node controlling the establishment of initial links to a first access node and the establishment of new links from a first access node to a second access node during a handoff operation using highly efficient messages and signal.

41 Claims, 7 Drawing Sheets

WIRELESS TERMINAL METHODS AND APPARATUS FOR ESTABLISHING CONNECTIONS

FIELD OF THE INVENTION

This invention relates to communications system and, more particularly, to methods and apparatus for establishing connections in wireless, e.g., cellular, communications networks.

BACKGROUND OF INVENTION

Communications system frequently include a plurality of network nodes which are coupled to access nodes through which end nodes, e.g., mobile devices, are coupled to the network. Network nodes may be arranged in a hierarchy. Access Authentication and Authorization (AAA) servers are nodes which are normally placed relatively high in the network hierarchy. They normally provide information used for security and access control purposes. Access nodes frequently have a secure link with an AAA server in cases where such servers are used. The secure link may be through one or more nodes in the hierarchy.

Operators typically manage access sessions in IP networks using the RADIUS protocol and associated RADIUS AAA servers. In the future, AAA systems may be based on new protocols such as DIAMETER. In a system using a RADIUS AAA server, when a user attempts to gain access to an operator network, for the duration of an access session, the local Access Router normally issues one or more RADIUS Access-Requests to an Authentication Server to authenticate that user based on its identity such as a Network Access Identifier (NAI). The AAA database typically has stored the identities of those users allowed to access its system along with the services features they are able to invoke. When the user is successfully authenticated, its access port on the access device is configured with policy state commensurate with the user's service Authorization. The service authorization is normally delivered via RADIUS to the Access Router by the Authorization Server. Whilst authorized, service usage during an access session is recorded by the Access Router, and sent as accounting records to an Accounting Server using Accounting-Request messages in the RADIUS protocol. The Accounting Server may be part of the AAA server or it may be an independent server using the same protocol with the authorization server. If the user is connected to multiple Access Routers during a single session then the multiple sessions need to be aggregated in the Accounting Servers.

AAA systems are typically used with Mobile IP to manage IP address allocations (HoAs), to dynamically allocate HAs, to distribute MN profiles to the Access Router and also to distribute security keys to authenticate MIP messages and to secure the air-link. The Mobile Node, an end node which is capable of changing its point of network attachment, typically sends a MIP message to gain access to the system, which triggers a AAA request to authenticate and authorize the Mobile Node. The AAA MN profile and security state is then passed from the AAA system to the Access Router to control services consumed by the MN.

MNs may change their point of network attachment, e.g., as they move from one cell to another cell. This involves changing the MNs point of attachment from a first access node, e.g., a first router, to a second access node, e.g., a second router. This process is commonly known as a handoff. As part of a handoff the MN's CoA/CCoA needs to be updated and then transferred into the HA using MIP signaling so that packets are redirected to the MN via the new Access Router. As part of handoff process, it is necessary to transfer at least some of the first access router's state information corresponding to the MN involved in the handoff to the new access router so that the MN service is not interrupted. This process is known as State Transfer. State transfer may include, e.g., the transfer of AAA profile state information that was previously delivered via RADIUS to the AR, at which the MN access session commenced. It also may include, e.g., the transfer of air-link security vectors, MN-NAI, MN IP Address, MN-EUI-64, remaining MIP Registration Lifetime, MN multicast group membership, admission control state, resource reservation state, diff-serv state, SIP session state, compressor state, MN scheduling history and/or many other potential items of MN specific AR state information.

In at least one known system, the transfer of state information during a handoff is accomplished by the new access node to which a mobile node is connecting sending a state transfer message through the communications network to the old access node to which the mobile node was connected. In response the old access node forwards state information to the new access node. Alternatively a core node is used to store state associated with a given mobile node. When said mobile node attempts to move to another target access node, said target access node can retrieve state associated with said mobile node from said core node.

Mobile IP, (versions 4 and 6) also known as MIPv4 [MIPv4] and MIPv6 [MIPv6], enables a mobile node (MN) to register its temporary location indicated by a care-of address (CoA) to its Home Agent (HA). The HA then keeps a mapping (also called a binding) between the MN's permanent address, otherwise called Home Address (HoA), and the registered CoA so that packets for that MN can be redirected to its current location using IP encapsulation techniques (tunneling). The CoA used by a MN can be an address that belongs to a Foreign Agent (FA) in an Access Router when MIPv4 is used or it can be a temporarily allocated address to the MN itself, from the Access Router prefix, in which case it is called a collocated care-of address (CCoA). The latter model also applies to MIPv4 while it is the only mode of operation in MIPv6. Note that for the purpose of this document the terms CCoA and CoA as well as Registration and Binding Update (BU) are interchangeable since they are the corresponding terms for MIPv4 and MIPv6.

The smallest possible MIPv4 compliant Registration Request message includes at least the following headers and fields.

IP header (at least 160 bits long)
UDP header (at least 64 bits long)
The UDP header is followed by the Mobile IP fields shown below: (at least 192 bits long)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |S|B|D|M|G|r|T|x|           Lifetime            |
+-+-+-+-+-+-+-+-+-+-+-+-+-+-+-+-+-+-+-+-+-+-+-+-+-+-+-+-+-+-+-+-+
|                         Home Address                          |
+-+-+-+-+-+-+-+-+-+-+-+-+-+-+-+-+-+-+-+-+-+-+-+-+-+-+-+-+-+-+-+-+
|                          Home Agent                           |
+-+-+-+-+-+-+-+-+-+-+-+-+-+-+-+-+-+-+-+-+-+-+-+-+-+-+-+-+-+-+-+-+
|                        Care-of Address                        |
+-+-+-+-+-+-+-+-+-+-+-+-+-+-+-+-+-+-+-+-+-+-+-+-+-+-+-+-+-+-+-+-+
|                                                               |
+                         Identification                        +
|                                                               |
+-+-+-+-+-+-+-+-+-+-+-+-+-+-+-+-+-+-+-+-+-+-+-+-+-+-+-+-+-+-+-+-+
| Extensions ...
+-+-+-+-+-+-+-+-
```

Type 1 (Registration Request)

S Simultaneous bindings. If the 'S' bit is set, the mobile node is requesting that the home agent retain its prior mobility bindings.

B Broadcast datagrams. If the 'B' bit is set, the mobile node requests that the home agent tunnel to it any broadcast datagrams that it receives on the home network.

D Decapsulation by mobile node. If the 'D' bit is set, the mobile node will itself decapsulate datagrams which are sent to the care-of address. That is, the mobile node is using a co-located care-of address.

M Minimal encapsulation. If the 'M' bit is set, the mobile node requests that its home agent use minimal encapsulation [34] for datagrams tunneled to the mobile node.

G GRE encapsulation. If the 'G' bit is set, the mobile node requests that its home agent use GRE encapsulation [16] for datagrams tunneled to the mobile node.

r Sent as zero; ignored on reception.

T Reverse Tunneling requested;

x Sent as zero; ignored on reception.

Lifetime

The number of seconds remaining before the registration is considered expired. A value of zero indicates a request for deregistration. A value of 0xffff indicates infinity.

Home Address

The IP address of the mobile node.

Home Agent

The IP address of the mobile node's home agent.

Care-of Address

The IP address for the end of the tunnel.

Identification

A 64-bit number, constructed by the mobile node, used for matching Registration Requests with Registration Replies, and for protecting against replay attacks of registration messages.

Extensions (at Least 176 Bits Long)

The fixed portion of the Registration Request is followed by one or more of the Extensions.

An authorization-enabling extension MUST be included in all Registration Requests.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |           SPI ...             |
+-+-+-+-+-+-+-+-+-+-+-+-+-+-+-+-+-+-+-+-+-+-+-+-+-+-+-+-+-+-+-+-+
|   ... SPI (cont.)             |        Authenticator ...      |
+-+-+-+-+-+-+-+-+-+-+-+-+-+-+-+-+-+-+-+-+-+-+-+-+-+-+-+-+-+-+-+-+
```

Type

32

Length 4 plus the number of bytes in the Authenticator.

SPI

Security Parameter Index (4 bytes). An opaque identifier.

Authenticator

The default authentication algorithm uses HMAC-MD5 to compute a 128-bit "message digest" of the registration message.

Authenticator Extension

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |           SPI ...             |
+-+-+-+-+-+-+-+-+-+-+-+-+-+-+-+-+-+-+-+-+-+-+-+-+-+-+-+-+-+-+-+-+
|   ... SPI (cont.)             |        Authenticator ...      |
+-+-+-+-+-+-+-+-+-+-+-+-+-+-+-+-+-+-+-+-+-+-+-+-+-+-+-+-+-+-+-+-+
```

Type

32

Length 4 plus the number of bytes in the Authenticator.

SPI

Security Parameter Index (4 bytes). An opaque identifier.

Authenticator

The default authentication algorithm uses HMAC-MD5 to compute a 128-bit "message digest" of the registration message.

The smallest possible MIPv4 compliant Registration Request message shown above is 592 bits long which can result in inefficient use of resources when it has to be transmitted over a wireless link for the purpose of registration and handoff. Note that in practice typical MIPv4 compliant Registration Request messages are significantly larger than the calculated minimum value but said minimum value is used for illustration purposes.

The smallest possible MIPv4 compliant Registration response message includes at least the following headers and fields.

IP header (at least 160 bits long)

UDP header (at least 64 bits long)

The UDP header is followed by the Mobile IP fields shown below: (at least 160 bits long)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |           Lifetime            |
+-+-+-+-+-+-+-+-+-+-+-+-+-+-+-+-+-+-+-+-+-+-+-+-+-+-+-+-+-+-+-+-+
|                         Home Address                          |
+-+-+-+-+-+-+-+-+-+-+-+-+-+-+-+-+-+-+-+-+-+-+-+-+-+-+-+-+-+-+-+-+
|                          Home Agent                           |
+-+-+-+-+-+-+-+-+-+-+-+-+-+-+-+-+-+-+-+-+-+-+-+-+-+-+-+-+-+-+-+-+
|                                                               |
+                        Identification                         +
|                                                               |
+-+-+-+-+-+-+-+-+-+-+-+-+-+-+-+-+-+-+-+-+-+-+-+-+-+-+-+-+-+-+-+-+
|    Extensions ...
+-+-+-+-+-+-+-+-
```

Type 3 (Registration Reply)

Code A value indicating the result of the Registration Request.

Lifetime

If the Code field indicates that the registration was accepted, the Lifetime field is set to the number of seconds remaining before the registration is considered expired. A value of zero indicates that the mobile node has been deregistered. A value of 0xffff indicates infinity.

Home Address
The IP address of the mobile node.
Home Agent
The IP address of the mobile node's home agent.
Identification
A 64-bit number used for matching Registration Requests with Registration Replies, and for protecting against replay attacks of registration messages.
Extensions (at Least 176 Bits Long)
The fixed portion of the Registration Reply is followed by one or more of the Extensions.
An authorization-enabling extension MUST be included in all Registration Replies.
Authenticator Extension

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |             SPI ...           |
+-+-+-+-+-+-+-+-+-+-+-+-+-+-+-+-+-+-+-+-+-+-+-+-+-+-+-+-+-+-+-+-+
|    ... SPI (cont.)            |         Authenticator ...     |
+-+-+-+-+-+-+-+-+-+-+-+-+-+-+-+-+-+-+-+-+-+-+-+-+-+-+-+-+-+-+-+-+
```

Type
32
Length
4 plus the number of bytes in the Authenticator.
SPI
Security Parameter Index (4 bytes). An opaque identifier.
Authenticator
The default authentication algorithm uses HMAC-MD5 to compute a 128-bit "message digest" of the registration message.

The smallest possible MIPv4 compliant Registration Response message shown above is 560 bits long which can result in inefficient use of resources when it has to be transmitted over a wireless link for the purpose of registration and handoff. Note that in practice typical MIPv4 Registration Response messages are significantly larger than the calculated minimum value but said minimum value is used for illustration purposes.

Also note that as it is well know to persons skilled in the art, the smallest possible Mobile IPv6 (MIPv6) compliant Binding Updated (equivalent to a MIPv4 Registration Request) is larger than the smallest possible MIPv4 compliant Registration Request message. Finally note that as it is well know to persons skilled in the art, the smallest possible Mobile IPv6 (MIPv6) compliant Binding Ack (equivalent to a MIPv4 Registration Response) is larger than the smallest possible MIPv4 compliant Registration Response message In view of the above discussion, it should be appreciated that there is a need for new and more efficient methods of implementing the establishment of network links to access nodes in the case of a mobile node initial registration with a network, a handoff to a new access node or in other cases where a mobile node enters a new cell.

SUMMARY OF THE INVENTION

The present invention is directed to methods and apparatus for establishing connections between wireless terminals and access nodes.

Various methods and apparatus of the invention can be used to establish communication links with one or more mobile nodes. Established links can be used to support communications sessions with one or more end nodes, e.g., mobile devices.

Various novel features are directed to mobile node methods of controlling the establishment of initial links to a first access node. Other features are directed to the establishment of a new link as part of a mobile node handoff from a first access node to a second access node during a handoff operation using highly efficient messages and signal.

Highly efficient messages, often far shorter than mobile IPv4 or IPv6 messages that might be used to perform similar tasks are generated, used and stored in accordance with various embodiments of the invention.

While some features are directed to wireless terminal methods and apparatus, as well as to novel messages of the invention stored in a wireless terminal, other features are directed to novel access node methods and apparatus.

The invention is also directed to data storage devices, e.g., memory devices, which store one or more of the novel messages of the present invention.

Additional features and benefits of the present invention are discussed in the detailed description which follows.

DETAILED DESCRIPTION

The methods and apparatus of the present invention for establishing link and network connections to access nodes used to support communications sessions with one or more end nodes, e.g., mobile devices, can be used with a wide range of communications systems. For example the invention can be used with systems which support mobile communications devices such as notebook computers equipped with modems, PDAs, and a wide variety of other devices which support wireless interfaces in the interests of device mobility.

Figure 1:
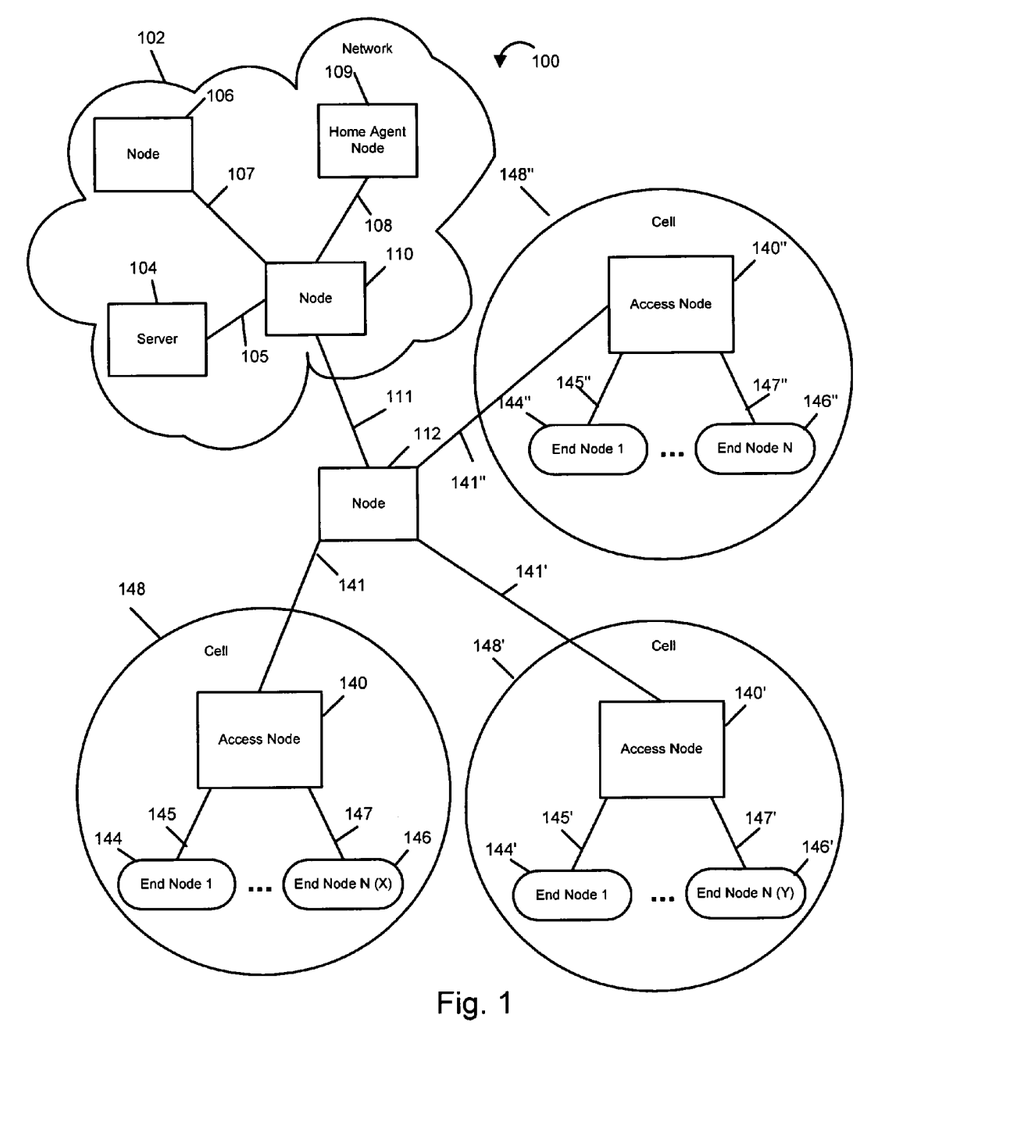
FIG. 1 illustrates a network diagram of an exemplary communications system implemented in accordance with the present invention.

FIG. 1 illustrates an exemplary communication system 100 implemented in accordance with the present invention, e.g., a cellular communication network, which comprises a plurality of nodes interconnected by communications links. Nodes in the exemplary communication system 100 exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of end nodes 144, 146, 144', 146', 144", 146", which access the communication system via a plurality of access nodes 140, 140', 140". The end nodes 144, 146, 144', 146', 144", 146" may be, e.g., wireless communication devices or terminals, and the access nodes 140, 140', 140" may be, e.g., wireless access routers or base stations. The exemplary communication system 100 also includes a number of other nodes 104, 106, 109, 110, and 112, used to provide interconnectivity or to provide specific services or functions. Specifically, the exemplary communication system 100 includes a Server 104, used to support transfer and storage of state pertaining to end nodes. The Server node 104 may be an AAA server, or it may be a Context Transfer Server, or it may be a server including both AAA server functionality and Context Transfer server functionality.

The FIG. 1 exemplary system 100 depicts a network 102 that includes the Server 104, the Home Agent node 109 and the node 106, all of which are connected to an intermediate network node 110 by a corresponding network link 105, 108 and 107, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 140, 140', 140" via network links 141, 141', 141", respectively.

Each access node 140, 140', 140" is depicted as providing connectivity to a plurality of N end nodes (144, 146), (144', 146'), (144", 146"), respectively, via corresponding access links (145, 147), (145', 147'), (145", 147"), respectively. In the exemplary communication system 100, each access node 140, 140', 140" is depicted as using wireless technology, e.g., wireless access links, to provide access. A radio coverage area, e.g., communications cell, 148, 148', 148" of each access node 140, 140', 140", respectively, is illustrated as a circle surrounding the corresponding access node.

The exemplary communication system 100 is subsequently used as a basis for the description of various embodiments of the invention. Alternative embodiments of the invention include various network topologies, where the number and type of network nodes, the number and type of access nodes, the number and type of end nodes, the number and type of Servers and Home or other Agents, the number and type of links, and the interconnectivity between nodes may differ from that of the exemplary communication system 100 depicted in FIG. 1.

In various embodiments of the present invention some of the functional entities depicted in FIG. 1 may be omitted or combined. The location or placement of these functional entities in the network may also be varied.

Figure 2:
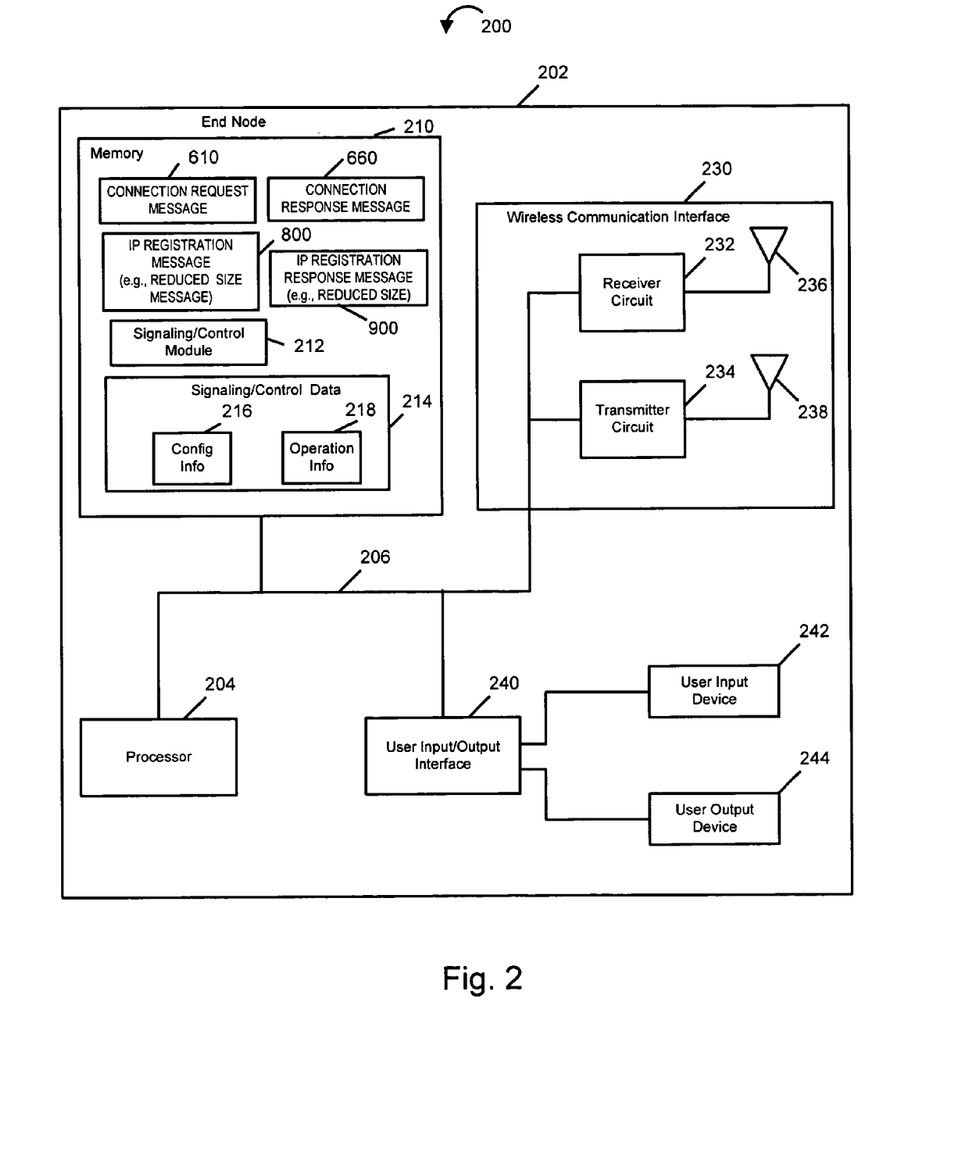
FIG. 2 illustrates an exemplary end node implemented in accordance with the present invention.

FIG. 2 provides a detailed illustration of an exemplary end node 200, e.g., a mobile node, implemented in accordance with the present invention. The exemplary end node 200, depicted in FIG. 2, is a detailed representation of an apparatus that may be used as any one of the end nodes 144, 146, 144', 146', 144", 146", depicted in FIG. 1. In the FIG. 2 embodiment, the end node 200 includes a processor 204, a wireless communication interface 230, a user input/output interface 240 and memory 210 coupled together by bus 206. Accordingly, via bus 206 the various components of the end node 200 can exchange information, signals and data. The components 204, 206, 210, 230, 240 of the end node 200 are located inside a housing 202.

The wireless communication interface 230 provides a mechanism by which the internal components of the end node 200 can send and receive signals to/from external devices and network nodes, e.g., access nodes. The wireless communication interface 230 includes, e.g., a receiver circuit 232 with a corresponding receiving antenna 236 and a transmitter circuit 234 with a corresponding transmitting antenna 238 used for coupling the end node 200 to other network nodes, e.g., via wireless communications channels.

The exemplary end node 200 also includes a user input device 242, e.g., keypad, and a user output device 244, e.g., display, which are coupled to bus 206 via the user input/output interface 240. Thus, user input/output devices 242, 244 can exchange information, signals and data with other components of the end node 200 via user input/output interface 240 and bus 206. The user input/output interface 240 and associated devices 242, 244 provide a mechanism by which a user can operate the end node 200 to accomplish various tasks. In particular, the user input device 242 and user output device 244 provide the functionality that allows a user to control the end node 200 and applications, e.g., modules, programs, routines and/or functions, that execute in the memory 210 of the end node 200.

The processor 204 under control of various modules, e.g., routines, included in memory 210 controls operation of the end node 200 to perform various signaling and processing as discussed below. The modules included in memory 210 are executed on startup or as called by other modules. Modules may exchange data, information, and signals when executed. Modules may also share data and information when executed. In the FIG. 2 embodiment, the memory 210 of end node 200 of the present invention includes a signaling/control module 212 and signaling/control data 214.

The signaling/control module 212 controls signal generation and processing relating to receiving and sending signals, e.g., messages, for management of state information storage, retrieval, and processing. Messages stored in memory 210 include a connection request message 610, a connection response message 660, an IP registration message 800 and an IP registration response message 900. Messages 800 and 900 may be reduced, e.g., small size, messages of the invention which are smaller than convention Mobile IP v4 and/or v6 messages. The messages stored in memory may be messages which are generated and/or received. The messages will be discussed in more detail below. Signaling/control data 214 includes state information, e.g., parameters, status and/or other information relating to operation of the end node. In particular, the signaling/control data 214 may include configuration information 216, e.g., end node identification information, and operational information 218, e.g., information about current processing state, status of pending responses, etc. The module 212 may access and/or modify the data 214, e.g., update the configuration information 216 and/or the operational information 218.

Figure 3:
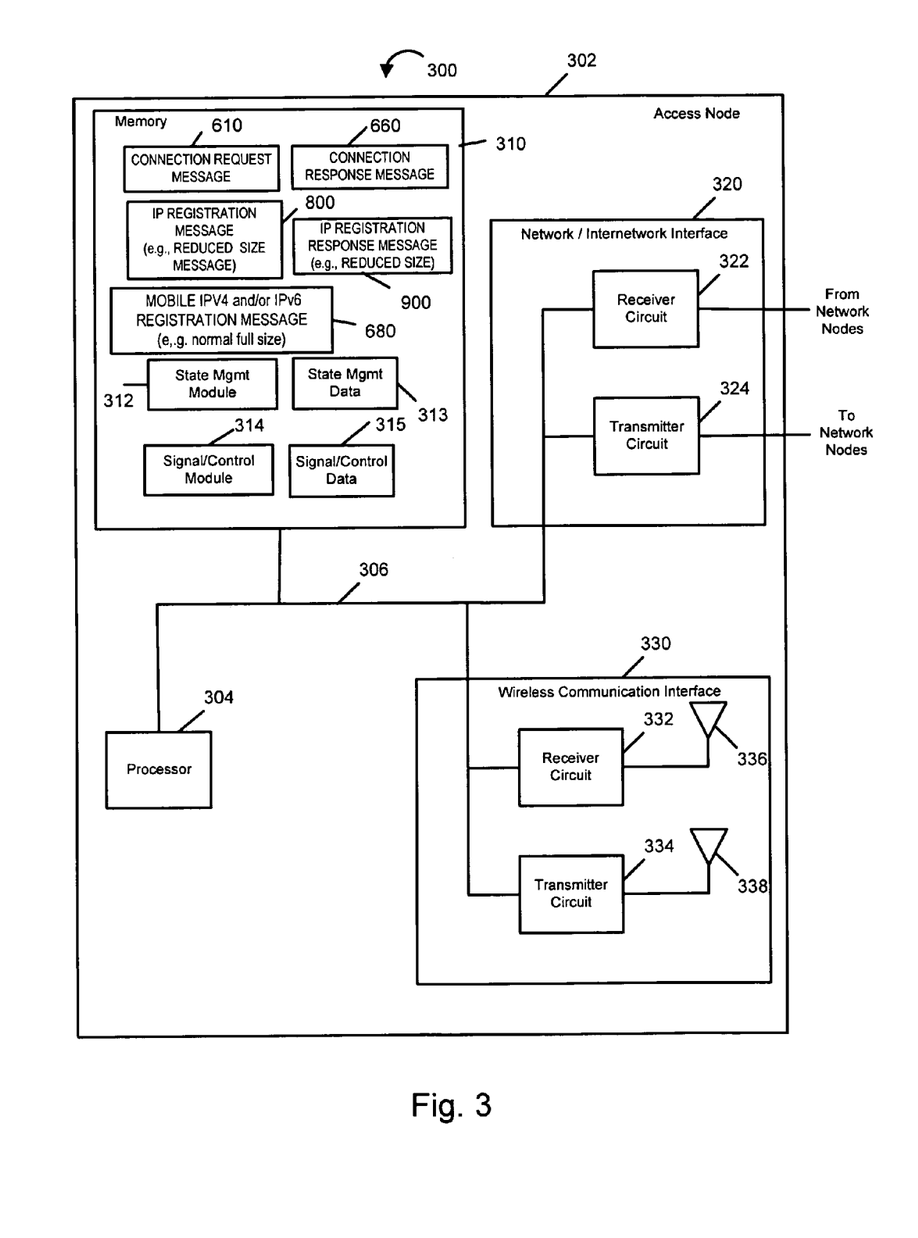
FIG. 3 illustrates an exemplary access node implemented in accordance with the present invention.

FIG. 3 provides a detailed illustration of an exemplary access node 300 implemented in accordance with the present invention. The exemplary access node 300, depicted in FIG. 3, is a detailed representation of an apparatus that may be used as any one of the access nodes 140, 140', 140" depicted in FIG. 1. In the FIG. 3 embodiment, the access node 300 includes a processor 304, memory 310, a network/internetwork interface 320 and a wireless communication interface 330, coupled together by bus 306. Accordingly, via bus 306 the various components of the access node 300 can exchange information, signals and data. The components 304, 306, 310, 320, 330 of the access node 300 are located inside a housing 302.

The network/internetwork interface 320 provides a mechanism by which the internal components of the access node 300 can send and receive signals to/from external devices and network nodes. The network/internetwork interface 320 includes, a receiver circuit 322 and a transmitter circuit 324 used for coupling the node 300 to other network nodes, e.g., via copper wires or fiber optic lines. The wireless communication interface 330 also provides a mechanism by which the internal components of the access node 300 can send and receive signals to/from external devices and network nodes, e.g., end nodes. The wireless communication interface 330 includes, e.g., a receiver circuit 332 with a corresponding receiving antenna 336 and a transmitter circuit 334 with a corresponding transmitting antenna 338. The interface 330 is used for coupling the access node 300 to other network nodes, e.g., via wireless communication channels.

The processor 304 under control of various modules, e.g., routines, included in memory 310 controls operation of the access node 300 to perform various signaling and processing. The modules included in memory 310 are executed on startup or as called by other modules that may be present in memory 310. Modules may exchange data, information, and signals when executed. Modules may also share data and information when executed. In the FIG. 3 embodiment, the memory 310 of the access node 300 of the present invention includes a State Management module 312 and a Signaling/Control module 314. Corresponding to each of these modules, memory 310 also includes State Management data 313 and the Signaling/Control data 315. Messages stored in memory 310 include a connection request message 610, a connection response message 660, an IP registration message 800 and an IP registration response message 900. Messages 800 and 900 may be reduced, e.g., small size, messages of the invention which are smaller than convention Mobile IP v4 and/or v6 messages. Memory 310 also includes a Mobile IPv4 and/or Mobile IPv6 registration message 680. The messages stored in memory may be messages which are generated and/or received. The messages will be discussed in more detail below.

The State Management Module 312 controls the processing of received signals from end nodes or other network nodes regarding state storage and retrieval. The State Management Data 313 includes, e.g., end-node related information such as the state or part of the state, or the location of the current end node state if stored in some other network node. The State Management module 312 may access and/or modify the State Management data 313.

The Signaling/Control module 314 controls the processing of signals to/from end nodes over the wireless communication interface 330, and to/from other network nodes over the network/internetwork interface 320, as necessary for other operations such as basic wireless function, network management, etc. The Signaling/Control data 315 includes, e.g., end-node related data regarding wireless channel assignment for basic operation, and other network-related data such as the address of support/management servers, configuration information for basic network communications. The Signaling/Control module 314 may access and/or modify the Signaling/Control data 315.

Figure 4:
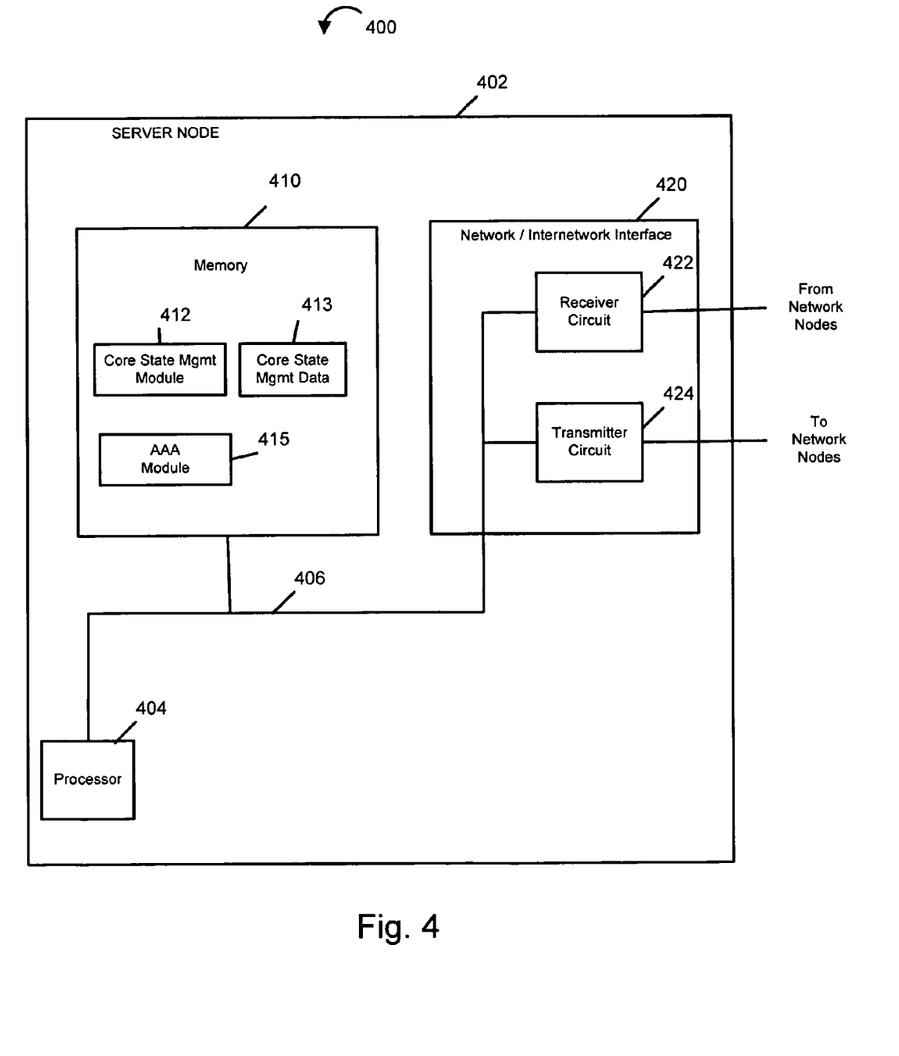
FIG. 4 illustrates an exemplary Server Node implemented in accordance with the present invention.

FIG. 4 provides a detailed illustration of an exemplary Server node 400 implemented in accordance with the present invention. The exemplary Server node 400, depicted in FIG. 4, is a detailed representation of an apparatus that may be used as the Server 104 depicted in FIG. 1. In the FIG. 4 embodiment, the Server node 400 includes a processor 404, memory 410, a network/internetwork interface 420, coupled together by bus 406. Accordingly, via bus 406 the various components of the access node 400 can exchange information, signals and data. The components 404, 406, 410, 420 of the access node 400 are located inside a housing 402.

The network/internetwork interface 420 provides a mechanism by which the internal components of the Server node 400 can send and receive signals to/from external devices and network nodes. The network/internetwork interface 420 includes, a receiver circuit 422 and a transmitter circuit 424 used for coupling the node 400 to other network nodes, e.g., via copper wires or fiber optic lines.

The processor 404 under control of various modules, e.g., routines, included in memory 410 controls operation of the Server 400 to perform various signaling and processing. The module included in memory 410 are executed on startup or as called by other modules that may be present in memory 410. In the FIG. 4 embodiment, the memory 410 of the Server 400 of the present invention includes a Core State Management module 412 and Core State Management data 413, and a AAA module 415.

The Core State Management Module 412 controls the processing of received signals from other Servers, access nodes, or network nodes regarding state storage and retrieval. The Core State Management Data 413 includes, e.g., end-node state information. The Core State Management module 412 may access and/or modify the Core State Management data 413. The AAA module 415 performs operation pertaining to authentication, authorization, and accounting.

Figure 5:
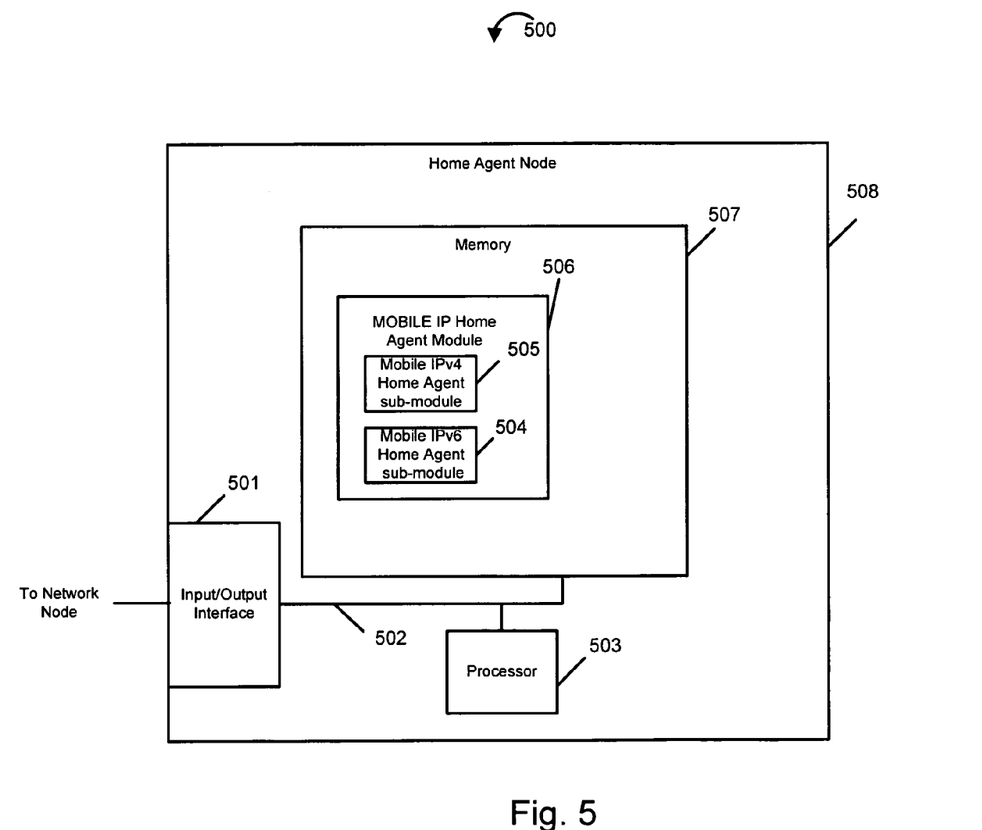
FIG. 5 illustrates an exemplary Home Agent node implemented in accordance with the present invention.

FIG. 5 illustrates an exemplary Home Agent node 500 implemented in accordance with the present invention. Exemplary Home Agent node 500 can be used in the system of FIG. 1, e.g., as home agent node 109 which serves as a Home Agent. In the FIG. 5 embodiment, the home agent node 500 includes an input/output interface 501, a processor 503 and memory 507, coupled together by bus 502. The elements 501, 502, 503 and 507 of home agent node 500 are located inside a housing 508, e.g., a case of plastic and/or metal, represented by the rectangle surrounding the node's internal elements 501, 502, 503 and 507. Accordingly, via bus 502 the various components of the access node 500 can exchange information, signals and data. The input/output interface 501 includes circuitry used for coupling the node 500 to other network nodes, e.g., via fiber optic lines, and potentially to end nodes, e.g., via wireless communications channels.

The processor 503 under control of various modules, e.g., routines, included in memory 507 controls operation of the home agent node 500 to perform various signaling, routing and other operations as will be discussed below. The modules included in memory 507 are executed on startup or as called by other modules. Modules may exchange data, information, and signals when executed. Modules may also share data and information when executed. In the FIG. 5 embodiment, the memory 507 of home agent node 500 of the present invention includes a mobility agent module 506 which includes, e.g., parameters, communication session and/or end node status information, security information, and/or other information relating to end node interaction and/or communication with an access node and/or another device. Mobility Agent module 506 also includes end node specific state including mappings between end node's home addresses and care-of addresses.

The mobility agent module 506 allows the node 500 to support end node mobility and connectivity management services. Thus, the home agent node 500 is capable of providing node mobility, session establishment, and session maintenance services to connected end nodes. The mobility agent module 506 may be implemented in a plurality of ways. In the FIG. 5 embodiment it is implemented with a collection of sub-modules. As illustrated, the mobility agent module 506 includes Mobile IPv4 sub-module 505 and Mobile IPv6 sub-module 504. By including sub-modules 505 and 504, the mobility agent module 506 is capable of supporting multiple versions of Mobile IP signaling including Mobile IPv4 and Mobile IPv6 signaling. In various embodiments, the mobility agent module 506 includes a subset of the sub-modules 505 and 504 shown in FIG. 5. For example, in embodiments where Mobile IPv6 is not required, the Mobile IPv6 Home Agent sub-module 504 may be omitted.

Figure 6:
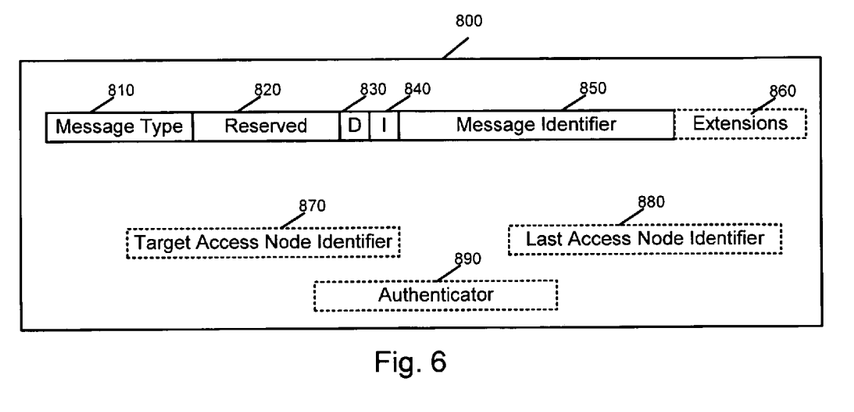
FIG. 6 illustrates an exemplary reduced size IP registration message implemented according to this invention.

FIG. 6 illustrates an exemplary reduced size IP registration message 800 implemented according to this invention. Said message 800, although sufficient for the purposes of setting up network layer connectivity and redirecting Mobile IP tunnels, as shown in the invention, is of smaller size than even the smallest possible Mobile IPv4 compliant Registration Request message shown in the background section. Exemplary reduced size IP registration message 800 includes: a Message Type field 810, a reserved field 820, a "D" (Deregistration) field 830, an "I" (Initial) field 840, a Message Identifier 850, and zero or more optional Extensions 860.

Message Type field 810 includes a value which identifies said message as a reduced size IP registration message. In some embodiment of this invention, message type field value identifies the message as a Mobility Management Protocol message referred to as L3RegistrationRequest message.

Reserved field 820 is reserved for future use. In one embodiment of this invention the value of reserved field 820 is set to zero by the sender and is ignored by the receiver.

"D" (Deregistration) field 830 includes a value which indicates whether this message is sent to register a network layer or to deregister from a previously registered network layer.

"I" (Initial) field 840 includes a value which indicates whether this message is the initial registration message for this network layer or a subsequent registration for a network layer that was established earlier.

Message Identifier 850 includes a value which distinguishes the message 800 from at least another message of the same type (message 800) sent prior to this one. In some exemplary embodiments of this invention the Message Identifier field 850 takes the values of a monotonically increasing sequence number. In other exemplary embodiments of this invention said Message Identifier field 850 takes the values of a timestamp. In still other exemplary embodiments of this invention said Message Identifier field 850 is comprised partly by a sequence number and partly by a timestamp.

Zero or more optional Extensions 860 may be included that may include various additional parameters. In some exemplary embodiments of this invention such extensions include the target access node Identifier extension 870, which identifies the access node that message 800 is sent to (e.g., target access node 530 in FIG. 8), the last access node identifier extension 880, which identifies the access node that the end node sending message 800 (e.g., end node 510 in FIG. 8) was last connected at the network layer with (e.g., access node 520 in FIG. 8) and an authenticator extension 890 authenticating message 800. In some exemplary embodiments of the invention each of said extensions 870 and 880 includes at least a Type field, the value of which identifies the type of the extension, a length field, the value of which identifies the length of the extension and an Identifier field, the value of which identifies one of target access node and last access node. In some such embodiments of the invention the authenticator extension 890 includes at least a Type field, the value of which identifies the type of the extension, a length field, the value of which identifies the length of the extension and an authenticator field, the value of which authenticates the message cryptographically; said authentication field value calculated based on a key shared between the sender and the receiver. In some exemplary embodiments of this invention, the last access node identifier extension 880 is not included when the value of the "I" filed 840 indicates that message 800 is an initial registration, while the last access node identifier extension 880 is included when the value of the "I" filed 840 indicates that message 800 is not an initial registration. In some embodiments of this invention the authenticator extension 890 is an optional extension so it may be omitted from message 800. Various combinations of optional extensions are possible, in accordance with various embodiments of the invention including zero, one two or three extensions 890.

In an exemplary embodiment of this invention, Message Type field 810 is 8 bits long, reserved field 820 is 14 bits long, "D" field 830 is a 1 bit long flag, "I" field 840 is a 1 bit long flag, Message Identifier 850 is comprised of a 16 bit sequence number and a 32 bit timestamp. In the same embodiment of this invention, when the optional extensions, target access node identifier 870 and last access node identifier 880, are included in the message 800, each is comprised of a 8 bit type field, 8 bit length field and at most 64 bit Identifier. In the same embodiment of this invention, when the optional authenticator extension 890 is included in the message 800, it comprises a 8 bit type file, 8 bit length field and at most 64 bit authenticator. In the same embodiment of this invention the maximum length of a reduced size IP registration message 800 is 312 bits which is significantly smaller than the smallest possible MIPv4 compliant Registration Request message which in the background section is shown to be 592 bits long.

Figure 7:
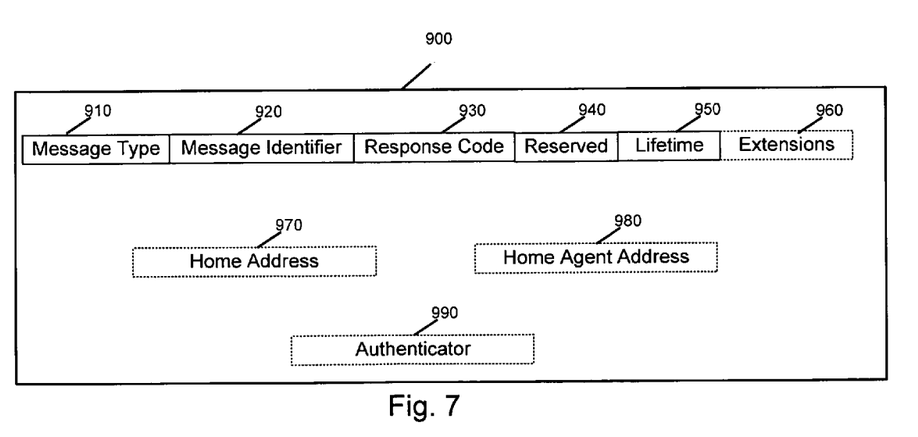
FIG. 7 illustrates an exemplary reduced size IP registration response message implemented according to this invention.

FIG. 7 illustrates an exemplary reduced size IP registration response message 900 implemented according to this invention. Said message 900, although sufficient for the purposes of setting up network layer connectivity and redirecting Mobile IP tunnels, as shown in the invention, is of smaller size than even the smallest possible Mobile IPv4 Registration response message shown in the background section. Exemplary reduced size IP registration response message 900 includes: a Message Type field 910, a Message Identifier field 920, a Response Code field 930, a Reserved field 940, a Lifetime field 950, and zero or more optional Extensions 960.

Message Type field 910 includes a value which identifies said message as a reduced size IP registration response message. In some embodiments of this invention the Message type field value identifies the IP Registration Response Message 900 as a Mobility Management Protocol message referred to as L3RegistrationResponse message.

Message Identifier 920, includes a value which matches message 900 with a corresponding reduced size IP registration message 800. In some embodiments of this invention the Message Identifier field 920 takes the values from at least part of the value of the Message Identifier field 850 of the corresponding reduced size IP registration message 800, said message 900 is in response to Response Code field 930 includes a value which indicates the success or failure of the IP registration operation.

Reserved field 940 is reserved for future use. In some embodiment of this invention the value of this reserved field 940 is set to zero by the sender and is ignored by the receiver.

Lifetime field 950 includes a value which indicates the lifetime of the IP registration. In some embodiments of this invention the value of the lifetime field 950 corresponds to the lifetime of an IP address associated with the receiver of message 900. In some such embodiments of this invention the receiver of message 900 should send another reduced size IP registration message before the value of the Lifetime field 950 expires following reception of message 900.

Zero or more optional Extensions 960 may be included that may include various additional parameters. In some embodiments of this invention such extensions include Home address extension 970, which is an IP address associated with the receiver of message 900 (e.g., the IP address of end node 510 in FIG. 8), the Home Agent Address extension 980, which identifies the address of the Mobile IP Home Agent serving the Home Address included in extension 970.and an authenticator extension 990 authenticating message 900. In some exemplary embodiments of the invention each of said extensions 970 and 980 includes at least a Type field, the value of which identifies the type of the extension, a length field, the value of which identifies the length of the extension and an address field, the value of which represents an IP address. In some such embodiments of the invention the authenticator extension 990 includes at least a Type field, the value of which identifies the type of the extension, a length field, the value of which identifies the length of the extension and an authenticator field, the value of which authenticates the message cryptographically; said authentication field value calculated based on a key shared between the sender and the receiver. In some exemplary embodiments of this invention, the home address extension 970 and home agent address extension 980 are only included when the value of the "I" filed 840 in the corresponding reduced size IP registration message 800, message 900 is in response to, indicates an initial registration, while the home address extension 970 and home agent address extension 980 are not included when the value of the "I" filed 840 in the corresponding reduced size IP registration message 800, message 900 is in response to, indicates a subsequent registration. Various combinations of optional extensions are possible in accordance with various embodiments of the invention including zero, one two or three of extensions 970, 980, 990.

In an exemplary embodiment of this invention, Message Type field 910 is 8 bits long, Message Identifier 920 is comprised of a 16 bit sequence number, Response code field 930 is 8 bits long, Reserved field 940 is 8 bits long and Lifetime field 950 is 16 bits long. In the same embodiment of this invention, when the optional extensions home address 970 and home agent address 980 are included in the message 900, each is comprised of a 8 bit type field, 8 bit length field and at most 32 bits IP address. In the same embodiment of this extension, when the optional authenticator extension 990 is included in the message 900, it comprises a 8 bit type file, 8 bit length field and at most 64 bit authenticator. In the same embodiment of this invention the maximum length of a reduced size IP registration response message 900 is 232 bits which is significantly smaller than the smallest possible MIPv4 compliant Registration response message which in the background section is shown to be 560 bits long.

Figure 8:
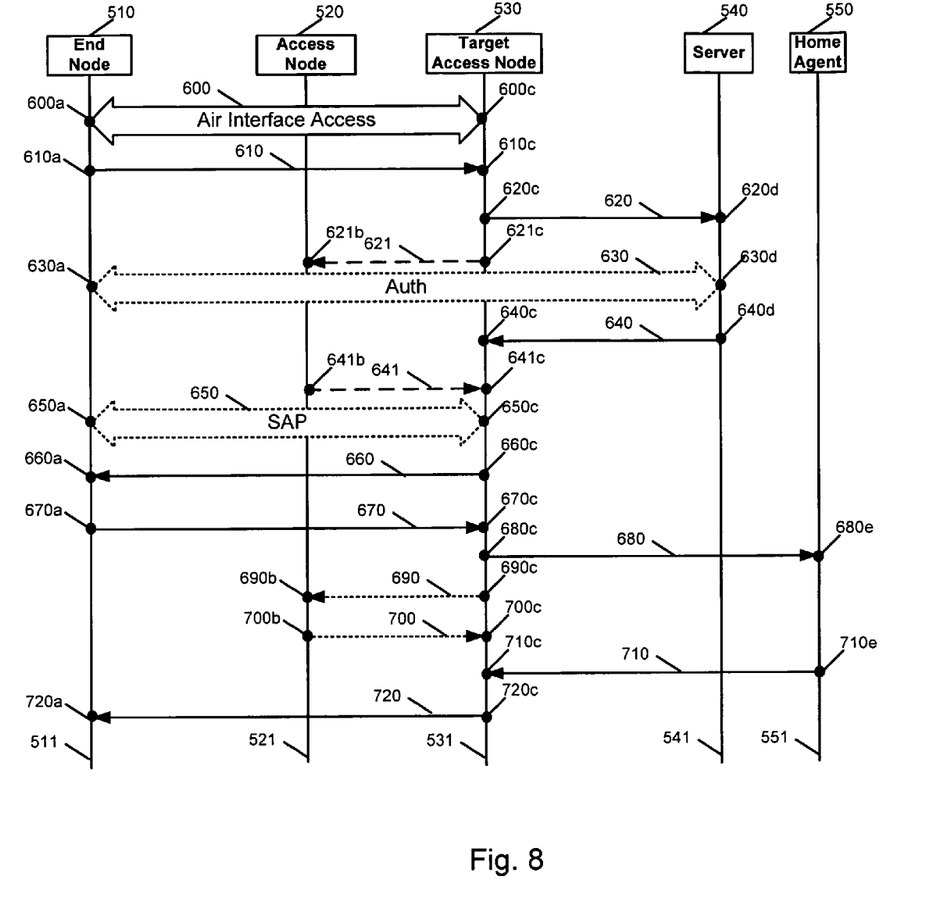
FIG. 8 illustrates exemplary signaling performed in accordance with the present invention when an end node transitions from one access node to another access node.

FIG. 8 illustrates exemplary signaling performed in accordance with exemplary embodiments of the invention. The signaling is illustrated in the context of exemplary system 100 illustrated in FIG. 1. The End Node 510 corresponds to any of the end nodes 144, 146, 144', 146', 144", 146" of the exemplary system 100 and is implemented according to exemplary end node implementation 200 of FIG. 2; Access Node 520 and Target Access Node 530 are simplified implementations of the exemplary access node 300 of FIG. 3 and correspond to any of the access nodes 140, 140', 140" in the exemplary system 100 of FIG. 1. The Server 540 is a simplified implementation of Server 400 in FIG. 4 and corresponds to Server 104 in the exemplary system 100 in FIG. 1. The Home Agent Node 550 is a simplified representation of home agent 500 in FIG. 5 and corresponds to home agent node 109 in exemplary system 100 in FIG. 1.

In FIG. 8 vertical solid lines 511, 521, 531, 541 and 551 represent nodes 510, 520, 530, 540 and 550 in time where the parts of lines 511, 521, 531, 541 and 551 at the top of FIG. 8 represent earlier time than the parts of said lines at the bottom of FIG. 8. Solid horizontal lines 610, 620, 640, 660, 670, 680, 690, 700, 710 and 720 represent signals between nodes 510, 520, 530, 540 and 550. Wide double arrow lines 600, 630 and 650 represent groups of signals exchanged between nodes 510, 520, 530, 540 and 550. Dashed lines 621 and 641 represent alternative signals to signals 620 and 640. Dotted lines 630 and 650 represent optional signals. A signal is transmitted between two nodes if the line representing such signal or group of signals indicates a dot at the vertical line representing said node in time. For example signal 610 is transmitted at time 610a by end node 510 and is received by target access node 530 at time 610c.

Physical Layer establishment will now be described. In FIG. 8 the end node 510, at point 600a transmits a signal, part of the group of signals 600, to target access node 530 requesting physical layer access to said node 530. Target access node 530 receives the signal, part of group of signals 600, at point 600c and transmits another signal, part of group of signals 600, to end node 510, granting physical layer access to end node 510.

Link Layer establishment will now be described. End node 510 at point 610a transmits Connections Request message 610 to target access node 530, requesting the establishment of link and media access control layer communications with target access node 530. In some exemplary embodiments of the invention the Connection Request message 610 includes a first identifier, identifying end node 510. In some embodiments of this invention said message 610 also includes a second identifier, identifying the access node that the end node 510 had previously established a connection with, e.g., access node 520. Said target access node 530 receives Connection Request message 610 at point 610c at which time the parameters (e.g., identifiers) included in said message 610 are stored in the memory of target access node 530. In other exemplary embodiments of this invention message 610 is a Handoff Request message indicating that end node 510 had earlier established communications with this or another access node (e.g., access node 520)

An exemplary Core Context Transfer embodiment will be described. At point 620c said node 530 transmits State Request message 620 to server 540, requesting authorization and other state corresponding to end node 530. State Request message 620 includes at least some of the parameters stored at point 610c in the memory of node 530; e.g., the identifier of end node 510. Server 540 receives State Request message 620 at point 620d and searches its memory for state associated with end node 510. In some exemplary embodiments of the invention where server 540 is a core state transfer server, said server 540 transmits state response message 640 at point 640d including authorization state and other state (e.g., security keys, IP addresses and other parameters) associated with end node 510. Target node 530 receives said message 640 at point 640c and stores in its memory at least part of the state associated with end node 510 that is included in message 640.

An AAA server embodiment will be described. In some other exemplary embodiments of this invention where server 540 is an authentication and authorization (AAA) server, server 540 transmits a message, part of an optional group of messages 630, at point 630d, requesting proof for the identity of end node 510. Said node 510 receives message, part of group of messages 630, at point 630a and transmit proof of identity message, part of group of messages 630, to Server 540. In some embodiments of this invention server 540 and end node 510 exchange additional messages that prove the identity of both end node 510 and server 540 to each other. When server 540 is satisfied with the identity of end node 510 at point 640d it sends message 640 including authorization state and other state (e.g., security keys, IP addresses and other parameters) associated with end node 510. Target access node 530 receives said message 640 at point 640c and stores in its memory at least part of the state associated with end node 510 that is included in message 640.

An exemplary Peer-to-Peer Context Transfer embodiment will be described. In some exemplary embodiments of the invention instead of message 620 the target access node 530 sends message 621, at point 621c, to access node 520; said access node 520 being the last access node that end node 510 had a connection with. Said message 621, according to this invention, including at least some of the parameters stored at point 610c in the memory of node 530; e.g., the identifier of end node 510. Access node 520 receives message 621 at point 621b and searches its memory for state associated with end node 510. Said access node 520 transmits response message 641 at point 641b including authorization state and other state (e.g., security keys, IP addresses and other parameters) associated with end node 510. Target node 530 receives said message 641 at point 641c and stores in its memory at least part of the state associated with end node 510 that is included in message 641.

An optional security association phase, used in some embodiments of the present invention, will now be described. In some embodiments of this invention where encryption of data traffic is required over the link between end node 510 and target access node 530, said node 530 transmits a message, part of an optional group of messages 650, at point 650c, to establish at least an encryption key with end node 510. Said node 510 receives message, part of group of messages 650, at point 650a and transmits key establishment message, part of group of messages 650, to target access node 530. In some embodiments of this invention target access node 530 and end node 510 exchange additional messages to establish the encryption key.

Completion of Link Layer establishment will now be described. Target access node 530, at point 660c, sends Connection Response message 660, granting at least link layer access to end node 510. End node 510 receives said message 660 at point 660a. In the embodiment of this invention where message 610 is a Handoff request message, message 660 is a Handoff Response message.

Network Layer establishment will now be described. End node 510 constructs in its memory and transmits reduced size IP registration message 670, at point 670a, to target access node 530 requesting network layer establishment with and packet redirection via said node 530. In some exemplary embodiments of the invention, said reduced size IP registration message 670 is implemented in accordance with the invention according to message type 800 of FIG. 6. Target access node 530 receives message 670 at point 670c and stores the values of at least some of the fields included in said message 670 in its memory. Target access node 530 constructs Mobile IP registration message 680 and transmits it at point 680c to home agent 550. According to this invention the Identification field of the Mobile IP registration request message 680 include at least a part of the Message Identifier field 850 of message 800 of FIG. 6.

An initial registration embodiment will now be described. In one exemplary embodiment of this invention, reduced size IP registration message 670 implemented according to message 800 in FIG. 6, the "I" field 840 indicates initial registration. In this embodiment of the invention target access node 530 constructs Mobile IP registration message 680 and transmits it at point 680c to home agent 550. For the construction of Mobile IP Registration Request message 680, target access node 530 combines state associated with end node 510 with state received at point 640c from server 540. In one embodiment of this invention where the server 540 is a AAA server, the state associate with end node 510 that is stored at node 530 includes a home address and home agent address values associated with end node 510, said home address and home agent address values being allowed to be equal to zero. In one embodiment of this invention the home agent address included in said stored state is not equal to zero and target access node 530 uses said value as part of the corresponding field of the Mobile IP registration request message 680. In another embodiment of this invention the home agent address included in said stored state is equal to zero and target access node 530 uses a locally configured home agent address value as part of the corresponding field of the Mobile IP registration request message 680. In another embodiment of this invention the home address included in said stored state is not equal to zero and target access node 530 uses said value as part of the corresponding field of the Mobile IP registration request message 680. In an additional embodiment of this invention the home address included in said stored state is equal to zero and target access node 530 uses the zero value as part of the corresponding field of the Mobile IP registration request message 680.

Home Agent 550 constructs and transmits registration response message 710 at point 710e to grant the registration request received earlier. Target access node 530 receives registration response message 710 at point 710c and stores at least part of the values included in the fields of message 710 in its memory. Said node 530 constructs in memory and transmits at point 720c reduced size IP registration message 720 to grant the network layer registration request to end node 530. In this exemplary embodiment of this invention, said reduced size IP registration response message 720 is implemented according to message type 900 of FIG. 7. In this embodiment of the invention, the Message Identifier field 920 of message 900 in FIG. 7 is copied from the corresponding Message Identifier included in the Message Identifier field 850 of message 800 in FIG. 6 this message transmitted in response to, the home address value included in message 710 from home agent 550 is used as part of the value of the home address extension 970 of message 900 in FIG. 7, the Lifetime value included in said message 710 is used as the upper limit for the value of the Lifetime field 950 of message 900 in FIG. 7, and the Home Agent Address value included in said message 710 is used part of the value of Home Agent Address extension 980 of message 900 in FIG. 7.

A subsequent registration embodiment will now be described. In one exemplary embodiment of this invention, reduced size IP registration message 670 implemented according to message 800 in FIG. 6, the "I" field 840 indicates a non-initial registration. According to one embodiment of the invention as discussed in FIG. 6, in a non-initial registration message 800 the last access node identifier extension 880 is included in said message 800. According to this invention said last access node identifier is set to an identifier that identifies access node 520.

In this embodiment of the invention target access node 530 constructs Mobile IP registration message 680 and transmits it at point 680c to home agent 550. For the construction of Mobile IP Registration Request message 680, target access node 530 combines state associated with end node 510 with state received at point 640c from server 540. In one embodiment of this extension where the server 540 is a Core Context Transfer server, the state associated with end node 510 that is stored at node 530 includes a home address and home agent address values associated with end node 510. In one embodiment of this invention target access node 530 uses said home address and home agent address values as part of the corresponding field of the Mobile IP registration request message 680.

Target access node 530 also constructs a Mobile IP registration message 690 and transmits it at point 690c to access node 520, which is identified in the last access node identifier extension of message 670. Access Node 520 receives message 690 at point 690b and transmits a response message 700 at point 700b. Target access node 530 receives said message 700 at point 700c. In another embodiment of this invention messages 690 and 700 are binding update messages while in another embodiment of this invention there are other packet redirect messages. According to this invention message 690 identifies at least the end node 510. In one embodiment of this invention said identifier being the IP address (Home address) of end node 510.

Home Agent 550 constructs and transmits registration response message 710 at point 710e to grant the registration request received earlier. Target access node 530 receives registration response message 710 at point 710c and stores at least part of the values included in the fields of message 710 in its memory. Said node 530 constructs in memory and transmits at point 720c reduced size IP registration response message 720 to grant the network layer registration request to end node 510. In the exemplary embodiment of this invention, said reduced size IP registration response message 720 is implemented according to message type 900 of FIG. 7. In this embodiment of the invention, the Message Identifier field 920 of message 900 in FIG. 7 is copied from the corresponding Message Identifier included in the Message Identifier field 850 of message 800 in FIG. 6 that this message 720 is being transmitted in response to and the Lifetime value included in said message 710 is used as the upper limit for the value of the Lifetime field 950 of message 900 in FIG. 7. In this embodiment of the invention the home address and home agent address extensions 970 and 980 of FIG. 7 are not included in message 720.

In one exemplary embodiment of this invention, end node 510 communicates with target access node 530 as shown in FIG. 8, while end node 510 has no other physical, link or network layer connection established with the same or different access node. In another exemplary embodiment of this invention, end node 510 communicates with target access node 530 as shown in FIG. 8, while end node 510 has at least one more physical, link or network layer connection established with the same or different access node e.g., access node 520.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal comprising:
   transmitting a connection request message to a target base station;
   receiving a connection response message from the target base station in response to said connection request message;
   generating an initial Internet Protocol (IP) registration message including an initial registration indicator value indicating that said IP registration message is an initial registration message for a network layer, said IP registration message having less bits than a Mobile IPv4 Registration Request message; and
   transmitting said IP registration message.

2. The method of claim 1 wherein transmitting said connection request message includes transmitting said connection request message over an air link.

3. The method of claim 2, wherein said connection request message includes a terminal identifier which identifies said wireless terminal.

4. The method of claim 1, wherein said IP registration message includes:
   a message type identifier identifying said message as an IP registration message; and
   a message identifier generated by said wireless terminal, the total number of bits included in said IP registration message being less than 480 bits.

5. The method of claim 4, wherein the generated IP registration message does not include a home agent address.

6. The method of claim 5, wherein the generated IP registration message also does not include a home address.

7. The method of claim 6, wherein the generated IP registration message also does not include a lifetime value.

8. The method of claim 7, wherein the generated IP registration message also does not include a care-of address.

9. The method of claim 4, wherein said message identifier is a time stamp.

10. The method of claim 4, wherein said message identifier is a sequence number.

11. The method of claim 4, wherein said message identifier is a combination of at least a sequence number and a time stamp.

12. The method of claim 1, wherein said initial registration indicator value is a one bit flag.

13. The method of claim 1, wherein said generating includes:
   incorporating a de-registration indicator value which can be set to indicate that said IP registration message is a request to de-register said wireless terminal.

14. The method of claim 13, wherein said de-registration indicator value is a one bit flag.

15. The method of claim 1, further comprising:
   receiving an IP registration response message in response to said IP registration message, said IP registration response message including a home address corresponding to said wireless terminal.

16. The method of claim 15, wherein the received IP registration response message includes a lifetime associated with the home address.

17. The method of claim 1, wherein transmitting said IP registration message includes transmitting said IP registration message to an access node which generates a standard Mobile IP registration message from said transmitted IP registration message.

18. The method of claim 17,
   wherein transmitting a connection request message to a target base station includes transmitting a link layer connections request message to said target base station requesting establishment of link layer communications with the target base station, said target base station being said access node.

19. A wireless terminal comprising:
   a transmitter for transmitting a connection request message to a target base station;
   a receiver module for receiving a connection response message from the target base station in response to said connection request message; and
   an Internet Protocol (IP) registration message generation module for generating an initial IP registration message including an initial registration indicator value indicating that said IP registration message is an initial registration message for a network layer, said IP registration message having less bits than a Mobile IPv4 Registration Request message.

20. The wireless terminal of claim 19, wherein said transmitter is coupled to an antenna for transmitting said connection request message over an air link.

21. The wireless terminal of claim 20, further comprising:
   memory including a stored connection request message, the stored connection request message including a terminal identifier which identifies said wireless terminal.

22. The wireless terminal of claim 19,
wherein said IP registration message generation module includes, in said registration message:
a message type identifier identifying said message as an IP registration message; and
a message identifier generated by said wireless terminal, the total number of bits included in said IP registration message being less than 480 bits.

23. The wireless terminal of claim 22, wherein the generated IP registration message does not include a home agent address.

24. The wireless terminal of claim 23, wherein the generated IP registration message also does not include a home address.

25. The wireless terminal of claim 22, wherein the generated IP registration message also does not include a lifetime value.

26. The wireless terminal of claim 25, wherein the generated IP registration message, also does not include a care-of address.

27. The wireless terminal of claim 19, further comprising:
memory for storing a received IP registration response message which is in response to said IP registration message, said IP registration response message including a Home Address corresponding to said wireless terminal.

28. The wireless terminal of claim 19, wherein said initial registration indicator value is a one bit flag.

29. A wireless terminal comprising:
means for transmitting a connection request message to a target base station;
means for receiving a connection response message from the target base station in response to said connection request message; and
means for generating an initial Internet Protocol (IP) registration message including an initial registration indicator value indicating that said IP registration message is an initial registration message for a network layer, said IP registration message having less bits than a Mobile IPv4 Registration Request message.

30. The wireless terminal of claim 29, further comprising:
means for storing said connection request message, the connection request message including a terminal identifier which identifies said wireless terminal.

31. The wireless terminal of claim 29, wherein said means for generating said registration message include, in said registration message:
a message type identifier identifying said message as an IP registration message; and
a message identifier generated by said wireless terminal, the total number of bits included in said IP registration message being less than 480 bits.

32. The wireless terminal of claim 31, wherein said message identifier is a combination of at least a sequence number and a time stamp.

33. The wireless terminal of claim 29, further comprising:
means for storing a received IP registration response message which is in response to said IP registration message, said IP registration response message including a Home Address corresponding to said wireless terminal.

34. The wireless terminal of claim 29, further comprising:
means for transmitting said IP registration message to an access node which generates a standard Mobile IP registration message from said transmitted IP registration message, said target base station being said access node.

35. The wireless terminal of claim 34,
wherein said means for transmitting a connection request message is configured to transmit to said access node, prior to transmission of said IP registration message, a link layer connections request message requesting the establishment of link layer communications with said access node.

36. A non-transitory computer readable medium including computer executable instructions, comprising:
instructions for causing a wireless terminal to transmit a connection request message to a target base station;
instructions for causing the wireless terminal to receive a connection response message from the target base station in response to said connection request message; and
instructions for causing the wireless terminal to generate an initial Internet Protocol (IP) registration message including an initial registration indicator value indicating that said IP registration message is an initial registration message for a network layer, said IP registration message having less bits than a Mobile IPv4 Registration Request message.

37. The non-transitory computer readable medium of claim 36, further comprising:
instructions for causing the wireless terminal to include in said generated IP registration message:
a message type identifier identifying said message as on IP registration message; and
a message identifier generated by said wireless terminal, the total number of bits included in said IP registration message being less than 480 bits.

38. The non-transitory computer readable medium of claim 37, wherein said message identifier is a combination of at least a sequence number and a time stamp.

39. A wireless terminal comprising:
a processor configured to control the wireless terminal to:
transmit a connection request message to a target base station;
receive a connection response message from the target base station in response to said connection request message;
generate an initial Internet Protocol (IP) registration message including an initial registration indicator value indicating that said IP registration message is an initial registration message for a network layer, said IP registration message having less bits than a Mobile IPv4 Registration Request message; and
transmit said Internet Protocol (IP) registration message; and
a memory coupled to said processor for storing said generated IP registration message.

40. The wireless terminal of claim 39 wherein the processor is configured to include in said IP registration message:
a message type identifier identifying said message as an IP registration message; and
a message identifier generated by said wireless terminal, the total number of bits included in said IP registration message being less than 480 bits.

41. The wireless terminal of claim 40, wherein said message identifier is a combination of at least a sequence number and a time stamp.

* * * * *

UNITED STATES PATENT AND TRADEMARK OFFICE
CERTIFICATE OF CORRECTION

| | | |
|---|---|---|
| PATENT NO. | : 8,184,615 B2 | Page 1 of 1 |
| APPLICATION NO. | : 11/249013 | |
| DATED | : May 22, 2012 | |
| INVENTOR(S) | : Georgios Tsirtsis et al. | |

It is certified that error appears in the above-identified patent and that said Letters Patent is hereby corrected as shown below:

Title page, item [75] inventor: George Tsirtsis should read -- Georgios Tsirtsis --

Signed and Sealed this
First Day of January, 2013

David J. Kappos
*Director of the United States Patent and Trademark Office*